3,249,495
SULFUR-CONTAINING PESTICIDES
Paul C. Aichenegg, Prairie Village, Kans., and Carl D. Emerson, Kansas City, Mo., assignors to Chemagro Corporation, New York, N.Y., a corporation of New York
No Drawing. Filed Jan. 17, 1964, Ser. No. 338,297
4 Claims. (Cl. 167—22)

This invention relates to new compounds and to pesticidal uses thereof.

It has been proposed to employ bis(2-chloroethyl) sulfone and bis(2-chloroethyl) sulfoxide as fungicides, nematocides and as non-selective herbicides having both pre-emergence and post-emergence activity, Curtis Patent 3,063,824. As acknowledged by Curtis, such compounds are not particularly effective as fungicides and nematocides but are more outstanding in their herbicide activity. The compounds of Curtis, moreover, are formed from β-chloroethyl sulfide, which is the very toxic mustard gas. The sulfone of Curtis, moreover, has undesirable vesicant properties. In forming the sulfoxide of Curtis there is present a little sulfide or over-oxidized sulfone in the product with the attendant vesicant hazards to humans.

Compounds which have good pre-emergent herbicide activity normally are not satisfactory as nematocides since there remains the problem of growing crops after the killing of the nematodes.

It is an object of the present invention to prepare novel sulfoxides.

Another object is to prepare improved compositions and processes for killing nematodes.

An additional object is to prepare such compositions without the danger of having serious vesicant hazards.

A further object is to prepare improved compositions and processes for killing fungi.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula $(CHX_2CHX)_2SO$ where each X is a halogen of atomic weight between 35 and 80, i.e., chlorine or bromine. Examples of such compounds are bis(1,2,2-trichloroethyl) sulfoxide, bis(1,2,2-tribromoethyl) sulfoxide, bis-(1,2-dichloro-2-bromoethyl) sulfoxide, 1,2,2-trichloroethyl 1',2'-dichloro-2'-bromoethyl sulfoxide. The preferred compound is bis(1,2,2-trichloroethyl) sulfoxide. It is critical that the bis(1,2,2-trihaloethyl) sulfoxide be used since when the corresponding bis(2,2,2-trihaloethyl) sulfoxide, e.g., bis(2,2,2-trichloroethyl) sulfoxide, is employed greatly inferior nematocide and fungicide properties result.

Obtaining good nematocidal and fungicidal activity thus is not merely a question of having a large amount of halogen present. This is further illustrated by the fact that bis(1,2,2,2-tetrachloroethyl) sulfoxide is ineffective as a nematocide and shows much poorer fungicidal activity than bis(1,2,2-trichloroethyl) sulfoxide.

Compounds such as bis(1,2,2-trichloroethyl) sulfoxide appear to exist in several modifications, e.g., as a solid and as an oil at room temperature. Both modifications are useful as nematocides and fungicides. Neither modification has undesirable vesicant properties.

The compounds of the present invention can be prepared by several methods.

(a) By oxidizing a pure bis(1,2,2-trihaloethyl) sulfide, e.g., with hydrogen peroxide or an organic peroxide such as peracetic acid.

(b) By oxidizing a crude bis(1,2,2-trihaloethyl) sulfide-disulfide mixture and removing sulfinic and sulfonic acids.

The compounds of the present invention also can be reduced to the corresponding bis(1,2,2-trihaloethyl) sulfides, and this serves as a convenient way for preparing such pure sulfides since it is difficult to prepare the sulfides in pure form directly by other routes, e.g., (1) by reacting sulfur dichloride with 1,2-dichloroethylene (either cis or trans or mixture of cis and trans) or (2) by reacting 1,2,2-trichloroethyl sulfenyl chloride with cis or trans-dichloroethylene in the presence of aluminum chloride or ferric chloride.

We have been unable to make sulfones corresponding to the sulfoxides of the present invention. Procedures for the oxidation of sulfides which normally result in sulfone formation in the instant situation stop at the sulfoxide stage.

Unless otherwise stated, all parts and percentages are by weight.

EXAMPLE I

In 800 parts (8.0 moles) of symmetric cis-dichloroethylene there were suspended 10 parts of anhydrous ferric chloride and 204 parts (2.0 moles) of sulfur dichoride were added at 30 to 35° C. over a period of 2.75 hours. The product was allowed to stand overnight and the ferric chloride removed by filtration. The material was washed with dilute aqueous hydrochloric acid and the organic layer dried and the solvent removed by stripping to give 383 parts of a crude mixture of bis(1,2,2-trichloroethyl) sulfide and bis(1,2,2-trichloroethyl) disulfide. Upon distillation in a high vacuum there were obtained 60.8 parts (22.2% yield) of pure bis(1,2,2-trichloroethyl) sulfide as a yellow oil, $B.P._{0.03}$ 102 to 108° C., $n_D^{20}$ 1.5705.

This example was repeated several times using cis, trans or a mixture of cis and trans symmetric dichloroethylene and reaction times from 2.5 to 3.0 hours. Removal of ferric chloride was also obtained by treatment twice with 1 volume of acetone followed by dilution with 2 volumes of water followed by drying. The yields of crude mixtures ranged from 65 to 96% and the yield of pure bis(1,2,2-trichloroethyl) sulfide ranged from 22 to 28%. The pure compound is identified hereinafter as Compound 4975.

EXAMPLE 2

1 part of aluminum chloride was suspended in 50 parts (0.5 mole) of cis-dichloroethylene and 20 parts (0.1 mole) of 1,2,2-trichloroethyl sulfenyl chloride were added dropwise at 57° C. over a period of 15 minutes. Further heating of the mixture for 1 hour at 60° C. completed the reaction. The aluminum chloride catalyst was removed by treatment with 1 volume of acetone and then 2 volumes of water, the organic layer dried and then freed of solvent by vacuum stripping. 24.5 grams of crude addition product were obtained as a brown oil, $n_D^{25}$ 1.5770. Distillation in a high vacuum gave 15.7 parts (53% yield) of bis(1,2,2-trichloroethyl) sulfide as a yellow oil, $B.P._{0.01}$ 110° C., $n_D^{25}$ 1.5736, having the same basic infrared spectrum as the product of Example 1. The procedure of Example 2 gave higher yields, e.g., 47 to 74.0% over several different runs, than that of Example 1. However, the product of Example 2, on the average, were not as pure as those of Example 1.

EXAMPLE 3

Into a suspension of 1 part of ferric chloride 30 parts of cis-1,2-dichloroethylene there were added dropwise with stirring 12 parts (0.06 mole) of 1,2,2-trichloroethyl sulfenyl chloride at 60° C. (moderate reflux) over a period of 15 minutes. Standing over night, removing ferric chloride by using acetone and water, drying of the remaining solution and removing the organic solvent in vacuum gave 16.3 parts of crude product which, in turn, furnished 7.6 parts (42.5% yield) of pure bis(1,2,2-trichloroethyl) sulfide as a yellow oil, B.P.$_{0.1}$ 125° C., $n_D^{20}$ 1.5710, when subjected to fractionation in high vacuum.

EXAMPLE 4

3.1 grams (0.01 mole) of bis(1,2,2-trichloroethyl) sulfoxide (prepared in Example 6) was taken up in a mixture of 20 ml. of glacial acetic acid and 20 ml. of acetic anhydride and reduced by dropwise addition under stirring of 15 ml. of a 20% TiCl$_3$ solution in concentrated hydrochloric acid at room temperature with occasional cooling to control the exothermic temperature rise over a period of 30 minutes. The mixture was then kept for 3 hours at 90° to 95° C. and allowed to stand overnight at room temperature. All operations were carried out in a nitrogen atmosphere. Filtering off the formed precipitate of titanium dioxide and oxychlorides, diluting the filtrate with 2 volumes of water, taking up the heavy oil into chloroform, repeated washing free of acid with water, drying and stripping of the solvent gave 2.8 grams (94% yield) of crude bis(1,2,2-trichloroethyl) sulfide, most of which distilled at 90° to 95° C. at 0.05 mm. Hg and having the same basic infrared spectrum as the product of Example 1.

EXAMPLE 5

Into 100 parts of a crude mixture of bis(1,2,2-trichloroethyl) sulfide and bis(1,2,2-trichloroethyl) disulfide, made as in Example 1, there were introduced under stirring and occasional cooling by means of an external ice-water bath at 30° C. over a period of 1 hour, 15 parts of dry chlorine gas, sufficient to convert the 70% disulfide in the crude mixture to easily distillable 1,2,2-trichloroethyl sulfenyl chloride. The resulting mixture was then subjected to flash evaporation at 0.1 mm. Hg. The sulfenyl chloride which came over at 30° to 40° C. was recovered by trapping and the residue distilled in a high vacuum to give 17 parts of bis(1,2,2-trichloroethyl) sulfide as a yellow oil in a yield of 57%. In other runs yields up to 63% were obtained.

EXAMPLE 6

62 grams (0.209 mole) of redistilled bis(1,2,2-trichloroethyl) sulfide were oxidized by diluting with 100 ml. of glacial acetic acid and gradually mixing with 23.7 grams of 30% aqueous hydrogen peroxide (a slight excess) followed by standing at room temperature (25° C.) over a period of 42 hours, followed by heating at 60° to 70° C. for a further 2 hours. Diluting with 2 volumes of water, taking up the precipitated oil into chloroform, removing free acetic acid by repeated washing with water, drying and stripping of the solvent furnished a yield of 55 grams (84% yield) of a heavy oil which on diluting with petroleum ether (Skelly B) and repeated cooling gave 21 grams (32% yield) of crude solid product which was recrystallized to give 17 grams (26% yield) of pure white crystals of bis(1,2,2 - trichloroethyl) sulfoxide, M.P. 88° C., B.P.$_{0.01}$ 102° to 105° C., Cl 67.0% (68.0% theory); S 10.0% (theory 10.2%). The pure solid product is identified hereinafter as Compound 4922.

In a repeat of this experiment using a 4 day standing period at room temperature for the oxidation the yield of pure product was increased to 34%. Low temperatures were also found to diminish the formation of unsaturated materials as impurities.

EXAMPLE 7

60 grams (.202 mole) of pure bis(1,2,2-trichloroethyl) sulfide were diluted with 150 ml. of glacial acetic acid, 20.2 grams of 30% aqueous hydrogen peroxide were added and the mixture allowed to stand for 4 days at room temperature (25° to 27° C.). The mixture was poured into 2 volumes of ice-water, the bottom oil taken up with chloroform and this solution treated as described in Example 6 to give 63.5 grams (quantitative yield) of crude oil, from which after removal of the solid bis(1,2,2-trichloroethyl) sulfoxide by chilling from the petroleum ether (Skelly B) and vacuum stripping gave 34.2 grams (54% yield) of bis(1,2,2-trichloroethyl) sulfoxide-oil form (i.e., the oil modification). This was subjected to high vacuum distillation and boiled 117° C. to 125° C. at 0.02 to 0.03 mm. Hg and had an $n_D^{20}$ 1.5602 to 1.5720. About 10 grams of the last fraction obtained in this range had an $n_D^{20}$ 1.5720 and was a thick, almost colorless syrup. The oil product was thus divided into two fractions. The lower boiling fraction in the 117° to 125° C. range analyzed Cl 66.3%, S 10.6% and the higher boiling fraction in the 117° to 125° C. range analyzed Cl 66.8%, S 11.6%. (Theory for bis(1,2,2-trichloroethyl) sulfoxide is Cl 68.0%, S 10.2%.) The infrared spectrum for the high boiling oil fraction in Example 7 was very similar to that of the solid product of Example 6, both showing peaks at 3.4 microns, about 7.8 microns, 9.3 microns, 9.8 microns, 12.6 microns and 13.7 microns. The spectrum for the solid product of Example 6 showed a trace of unsaturated impurity at 10.9 microns while the spectrum of the oil of Example 7 showed considerably more unsaturated impurity at 10.9 microns and also showed unsaturated impurities at 6.4 microns. The high boiling fraction in Example 7 was redistilled and had a B.P.$_{.03}$ 115° to 117° C. This oily modification of bis(1,2,2-trichloroethyl) sulfoxide is identified hereinafter as Compound 5008.

Crystallization of the oily modification of bis(1,2,2-trichloroethyl) sulfoxide prepared in Example 7 could not be achieved in this experiment or in a repeat experiment in which 51% yield of the oily modification was obtained.

EXAMPLE 8

10 grams of ferric chloride (anhydrous) were suspended in 400 grams (100% excess) of vinylidene chloride and 102 grams (1.0 mole) of sulfur dichloride were added dropwise under stirring and occasional cooling to maintain a gentle reflux (35° C.) over a period of 1 hour. Standing overnight, heating to reflux for 3 hours, removing ferric chloride by treatment with acetone, drying and stripping off excess vinylidene chloride gave 232 grams of crude bis(2,2,2-trichloroethyl) sulfide-bis(2,2,2-trichloroethyl) disulfide mixture which was subjected to fractionation. A 30% yield was obtained of a colorless fraction which had a B.P.$_{0.02}$ 91° C., $n_D^{20}$ 1.5642. This was redistilled to give pure bis(2,2,2-trichloroethyl) sulfide (Compound 5006), B.P.$_{.07}$ 88° to 89° C., $n_D^{20}$ 1.5551. The product solidified on standing to white needles M.P. 45° C.

EXAMPLE 9

3.5 grams (0.0118 mole) of bis(2,2,2-trichloroethyl) sulfide were diluted with 10 ml. of glacial acetic acid and 1.2 grams of 31.0% aqueous hydrogen peroxide (0.011 mole) added. The mixture was allowed to stand for 6 days at room temperature (25° to 30° C.) and diluted with water to give 3.7 grams (quantitative yield) of the crude product as a white solid. The latter was taken up in chloroform, washed several times with water, dried and stripped to give 1.8 grams (50% yield) of bis(2,2,2-trichloroethyl) sulfoxide (Compound 5025) as a white solid which on recrystallization had a M.P. of 135° to 137° C. and a B.P.$_{0.09}$ of 143° to 144° C.

The compounds of the present invention can be used alone as nematocides or fungicides but it has been found desirable to apply them to the pest, e.g., to the soil habitat of nematodes, together with inert solids to form dusts, or, more preferably, suspended in a suitable liquid diluent, preferably water. There can also be added surface active agents and inert solids in such liquid formulations. Desirably, 0.05 to 1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, alcohols, e.g., ethanol, isopropanol and amyl alcohol, etc.

The nematocides and fungicides of the present invention can also be applied with inert nematocidal or fungicidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkyaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkyl-phenol-ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyl-taurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris(polyoxyethylene) sorbitan monostearate (Tween 60), sodium dihexyl sulfosuccinate.

The solid and liquid formulations can be prepared by any of the conventional methods. Thus, the active ingredient can be mixed with the solid carrier in finely divided form in amounts small enough to preserve the free-flowing property of the final dust composition.

In commercial practice the compositions containing the nematocides of the present invention are applied to the soil infected with nematodes.

In the following examples or tables illustrating nematocidal or fungicidal activity the compounds of the invention as well as the comparison compounds were formulated as wettable powders consisting of 50% of the compound being tested, 46% Hi-Sil 233 (ultrafine silica), 2% Maresperse N (sodium lignin sulfonate) and 2% Pluronic L-61 (polyethylene oxide-propylene oxide adduct molecular weight about 1000). This wettable powder is hereinafter designated as Formulation A.

Compound
code number:     Chemical Name
- 4337 — Bis(2-chloroethyl) sulfoxide.
- 4242 — Bis(2-chloroethyl) sulfone.
- 4922 — Bis(1,2,2-trichloroethyl) sulfoxide (solid).
- 5008 — Bis(1,2,2-trichloroethyl) sulfoxide (oil).
- 5025 — Bis(2,2,2-trichloroethyl) sulfoxide.
- 5054 — Bis(1,2,2-tetrachloroethyl) sulfoxide.

EXAMPLE 10

The saprophytic nematode tests were carried out in water as the medium with Panagrellus and Rhabditis spp. at room temperature utilizing Formulation A. The results are recorded as percent kill at the indicated dosages in parts per million after a 4 day incubation period. A 10% kill is merely the same amount of kill as occurs with a blank sample.

Table I

| Compound | NESA at ppm. | | | | |
|---|---|---|---|---|---|
| | 200 | 100 | 50 | 25 | 12.5 |
| 4922 | 100 | 100 | 100 | 40 | 40 |
| 5008 | 100 | 100 | 100 | 70 | 30 |
| 5025 | 100 | 40 | 10 | 10 | 10 |
| 5054 | 30 | 10 | 10 | 10 | 10 |
| 4242 | 62 | | 18 | | 9 |
| 4337 | 20 | | 20 | | 20 |

It will be observed that both the oily and solid modifications of bis(1,2,2-trichloroethyl) sulfoxide were still effective saprophytic nemtocides at ⅛ the dosage of the closely related bis(2,2,2-trichloroethyl) sulfoxide and at 1/16 the dosage of bis(1,2,2,2-tetrachloroethyl) sulfoxide. It is also apparent that Compounds 4922 and 5008 are far more nematocidally effective than Compounds 4242 and 4337.

Compound 4922 was also tested against parasitic nematodes employing Formulation A. The nematode employed was Meloidogyne spp. and the procedure was a 10 day contact test carried out in a water-agar medium in the presence of tomato roots at room temperature. The results are given on a 0–10 scale where 0 indicates the presence of severe knotting, i.e., no effectiveness and 10 indicates no knots, i.e., 100% effectiveness. Compound 4922 rated 10 at 25 p.p.m. and 5 at 12.5 p.p.m. whereas the remaining compounds of Table I were ineffective at the given rates.

EXAMPLE 11

The compounds were also tested as fungicides in plate fungicide tests as indicated in Table II. The compounds were made up into Formulation A and then added to agar cultures of the fungi. In the table 10 indicates 100% effectiveness and 0 indicates no effectiveness. In Table II Py stands for Pythium spp., Rh for Rhizoctonia, F for Fusarium and H for Helminthosporium. The concentrations are expressed as parts per million (p.p.m.).

Table II

| Compound | Py | | Rh | | F | | H | |
|---|---|---|---|---|---|---|---|---|
| | 100 | 10 | 100 | 10 | 100 | 10 | 100 | 10 |
| 4922 | 10 | 10 | 10 | 10 | 10 | 3 | 10 | 10 |
| 5008 | 10 | 10 | 10 | 10 | 10 | 3 | 10 | 10 |
| 5025 | 0 | 0 | 0 | 0 | 0 | 0 | 0 | 0 |
| 5054 | 0 | 0 | | | 0 | 0 | 0 | 0 |
| 4337 | 10 | 0 | 10 | 0 | 0 | 0 | 10 | 5 |

Compounds 4922 and 5008 were also very effective as soil fungicides at the rate of (lbs./acre) of 200, 100, 50, 25 and 12.5. Compound 4922 was better than 5008 particularly at rates of 25 lbs./acre and below.

We claim:

1. A process of killing nematodes comprising subjecting said nematodes to a nematocidally effective amount of a compound having the formula $(CHX_2CHX)_2SO$ where X is a halogen of atomic weight between 35 and 80.

2. A process of killing nematodes comprising applying to nematode infested soil a nematocidally effective amount of bis(1,2,2-trichloroethyl) sulfoxide.

3. A process of killing fungi comprising subjecting said fungi to a fungicidally effective amount of a compound having the formula $(CHX_2CHX)_2SO$ where X is a halogen of atomic weight between 35 and 80.

4. A process of killing fungi comprising subjecting said fungi to a fungicidally effective amount of bis(1,2,2-trichloroethyl) sulfoxide.

References Cited by the Examiner

UNITED STATES PATENTS

| 2,290,235 | 7/1942 | Guy | 167—22 |
| 2,661,376 | 12/1953 | Pfahler | 260—607 |
| 2,793,234 | 5/1957 | Metivier | 260—607 |
| 2,818,365 | 12/1957 | Deebel | 167—22 |
| 2,818,388 | 12/1957 | Sullivan et al. | 252—75 |
| 3,063,824 | 11/1962 | Curtis | 167—22 |

JULIAN S. LEVITT, *Primary Examiner.*